UNITED STATES PATENT OFFICE.

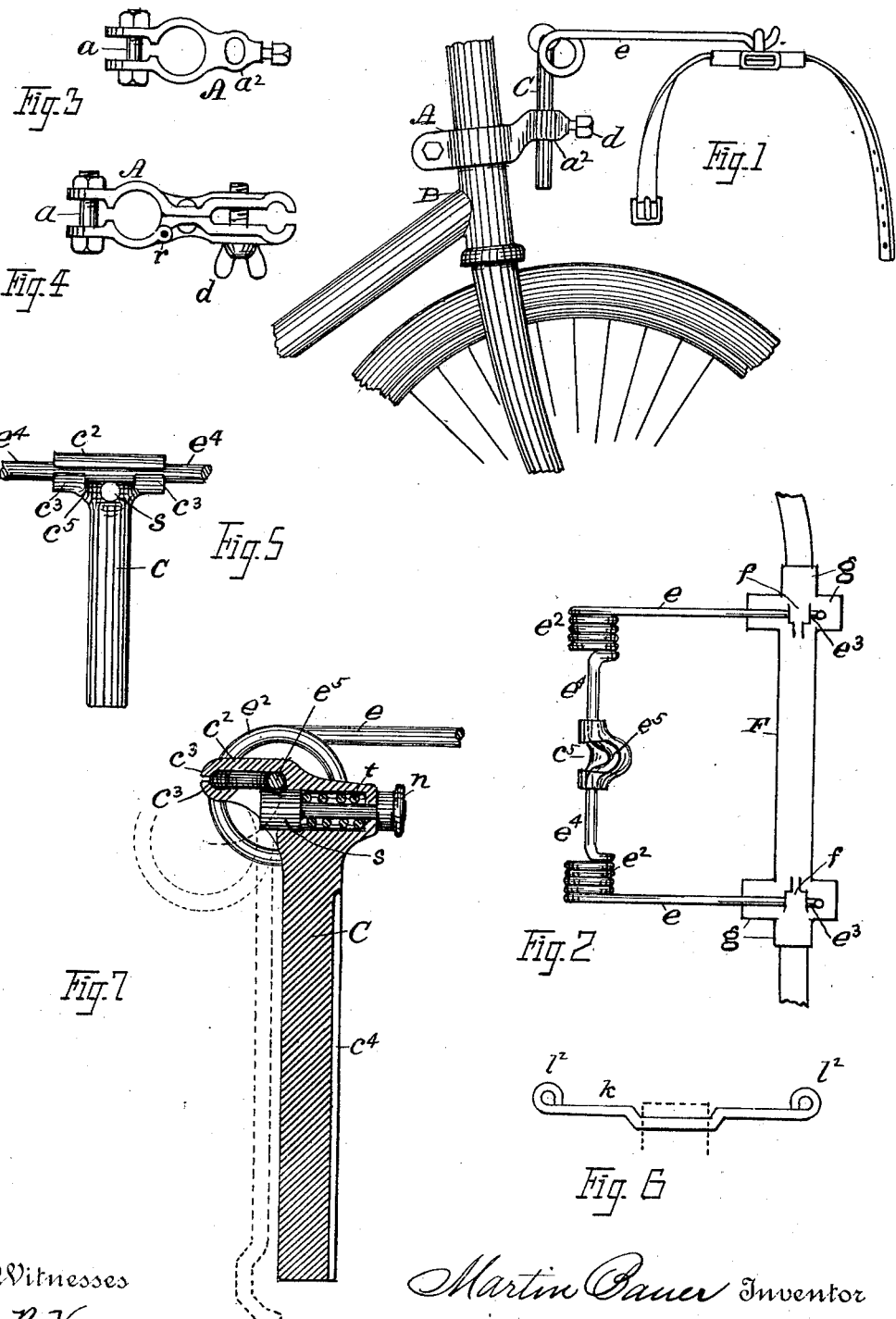

MARTIN BAUER, OF CLEVELAND, OHIO.

LUGGAGE-CARRIER FOR BICYCLES, &c.

SPECIFICATION forming part of Letters Patent No. 660,616, dated October 30, 1900.

Application filed August 30, 1900. Serial No. 28,490. (No model.)

*To all whom it may concern:*

Be it known that I, MARTIN BAUER, a citizen of the United States, residing at Cleveland, in the county of Cuyahoga and State of Ohio, have invented certain new and useful Improvements in Luggage-Carriers for Bicycles, &c.; and I do hereby declare the following to be a full, clear, and exact description of the invention, such as will enable others skilled in the art to which it appertains to make and use the same.

My invention relates to attachments to bicycles and like vehicles for carrying bundles or luggage of any kind, and particularly such as are fragile or liable to injury from the jarring to which articles tied or otherwise attached to an ordinary bicycle are subjected.

The object of my invention is to provide an attachment by which injury to the articles carried may be avoided and objects of diverse shape and size be held without inconvenience to the rider or risk of injury; and my invention consists in the construction and combination of parts designed to permit the aforesaid object to be attained, as hereinafter fully described, and specifically pointed out in the claims.

In the drawings, Figure 1 is a side view in elevation, showing my device attached to the head of a bicycle. Fig. 2 is a plan view of the ordinary form thereof. Fig. 3 is a detached view of the clamp A; Fig. 4, a detail view of a modified form of clamp. Fig. 5 is a detached view of the stem C. Fig. 6 shows a special form of holder; and Fig. 7 is a sectional detail of the preferred form, showing how the carrier may be folded back when not in use.

A represents a clamp, which may be of any suitable or preferred construction, capable of being securely affixed to the frame B of a bicycle. I have shown the clamp in Fig. 1 attached to the head of the bicycle; but it could be attached to the stem of the handle-bars or to the saddle-post or back-brace, if preferred. The clamp A is attached to the frame by any suitable means, such as the screw-bolt $a$, and has a lug $a^2$, through which passes a vertically-adjustable stem C, held in place by a set-screw $d$, the stem C being preferably of a non-cylindrical form or else flattened or grooved on one side, as shown at $c^4$, Fig. 7, to prevent its turning to either side. The stem C is preferably formed of malleable casting, in which is pivotally secured the straight portion $e^4$ of the arms $e$ between the coils $e^2$, while the outer ends of the arms $e$ $e$ terminate in hooks $e^3$ and are continuous with the coils $e^2$, whereby the arms $e$ $e$, which are themselves more or less springy, are given any desired degree of resiliency, according to the load they are intended to support, and are, besides, laterally resilient, so that by spacing the attachment of the bundle to the hooks $e^3$ a trifle nearer together than the normal distance of the arms $e$ from each other the lateral spring of the arms causes the package to be held more securely and prevents its shaking or rattling. The arms $e$ and coils $e^2$ are preferably formed of stout wire and all in one piece, the central straight portion $e^4$ being inserted in a groove cast in the transverse head $c^2$ of the stem C and the edges $c^3$ of the groove closed over it, so as to hold it in place. The arm $e$ and coils $e^2$ could obviously be formed from plate or sheet metal; but it is not considered desirable.

The central part of the transverse head $c^2$ of the stem C may be recessed, as shown at $c^5$ in Fig. 2, and the central part of the rod $e^4$ be bent so as to form a stop $e^5$, which, resting on the bottom of the recess $c^5$, maintains the arms $e$ normally in the horizontal position, (shown in Fig. 1,) but permits the arms $e$ to be folded backward until they lie parallel with the stem C, as shown in Fig. 7; but I prefer to provide in the head of the stem C a sliding pin $s$, which under the action of a spring $t$ projects into the recess $c^5$ beneath the stop $e^5$, so as to support the arms $e$ in the horizontal position, (shown in Fig. 1.) By drawing out the pin $s$ by means of the button $n$, secured thereto, the arms $e$ can be folded downward to the position indicated by dotted lines in Fig. 7, in which they are entirely out of the way. When it is desired to use the carrier, the arms $e$ are simply lifted forward and upward, the bend or stop $e^5$ forcing in the pin $s$, which snaps back into place beneath the stop $e^5$ and the carrier is then ready for use.

This obviates the necessity of turning any screw in case the stem should be set high up in the clamp, as is sometimes desirable.

The bundle may be fixed to or hung upon the arms e e; but preferably a holder F, having eyes or loops f and tubular or other guides or eyes g g, through which the straps or cords may be passed, is detachably suspended from the hooked ends of the arms e e, and to this holder the bundle or luggage is secured by means of cords or straps i, which pass through the guides g g of the holder. The holder F, being detachable, can be affixed to the bundle and then hung upon the arms e, which is very much more convenient than to secure a parcel to a carrier already affixed to the bicycle. In addition to this any special form of holder which may be best adapted to any particular form of package which one may habitually carry can be provided and attached to the arms e e. An example of this is shown in Fig. 6, in which k represents a holder especially designed to receive and hold a basket, as shown in dotted lines, and with eyes $l^2$ to engage the hooks of the arms e e. Other special holders may be made in a similar manner.

When the bundle-carrier is not needed, it can be folded down, as shown in Fig. 7, or the stem C and other parts connected therewith may be removed by loosening the screw d, leaving only the inconspicuous clamp A attached to the bicycle. By the vertical adjustment of the stem C room for bundles of varying sizes is obtained and the whole apparatus is exceptionally light and neat. By folding the arm e backward along the stem C after the latter is removed from the clamp A the carrier can easily be put in the pocket and be ready at all times to be attached to the bicycle when needed.

To enable the clamp A to be attached to or removed from such parts as the saddle-post or handle-bar stem without the necessity of removing such parts or disturbing their adjustment, the clamp may advantageously have one of its jaws which engage such part hinged, as shown at r in Fig. 4, so that by loosening the clamp-bolt a the hinged jaw can be opened and the clamp quickly applied. This avoids the possibility of distorting the clamp by springing open its jaws, if solid, to force it upon the part to which it is to be applied.

What I claim is—

1. In a luggage-carrier for bicycles the combination of a clamp secured to the bicycle, a stem vertically adjustable in said clamp, a rod or wire passing transversely through the stem and having centrally a stop to limit its downward rotation and at its extremities coils which terminate in forward-projecting arms provided terminally with hooks, and a holder having eyes to engage said hooks and means for securing the bundle thereto, substantially as described.

2. In a luggage-carrier for bicycles the combination of a clamp secured to the bicycle, an upright stem supported by said clamp, a rod or wire passing transversely through the stem pivotally and having centrally a stop to limit its downward rotation and at its extremities coils which terminate in forward-projecting arms provided terminally with hooks, a catch in said stem engaging said stop and supporting the arms in position for use, and a holder having eyes to engage said hooks and provided with means for securing the bundle thereto, substantially as described.

3. In a luggage-carrier for bicycles the combination of a clamp secured to the bicycle, an upright stem supported by said clamp, a rod or wire passing transversely through the stem pivotally and having centrally a stop to limit its downward rotation and at its extremities coils which terminate in forward-projecting arms provided terminally with hooks, a movable catch in said stem engaging said stop and supporting the arms in position for use, and a holder having eyes to engage said hooks and provided with means for securing the bundle thereto, substantially as described.

4. In a luggage-carrier for bicycles the combination of a clamp secured to the bicycle, an upright stem supported by said clamp, a rod or wire passing transversely through the stem pivotally and having centrally a stop to limit its downward rotation and at its extremities coils which terminate in forward-projecting arms provided terminally with hooks, a spring-catch in said stem engaging said stop and supporting the arms in position for use, and a holder having eyes to engage said hooks and provided with means for securing the bundle thereto, substantially as described.

5. In a luggage-carrier for bicycles the combination of a clamp secured to the bicycle, a detachable stem vertically adjustable in said clamp, a rod or wire passing transversely through the stem pivotally and having centrally a stop to limit its downward rotation and at its extremities coils which terminate in forward-extending arms with terminal hooks, a spring-catch in said stem engaging said stop and supporting the arms in position for use, and a holder provided with eyes for engaging said hooks and with guides for receiving the cords or straps by which the bundle is secured thereto, substantially as described.

In testimony whereof I hereto affix my signature in presence of two witnesses.

MARTIN BAUER.

Witnesses:
WALTER E. MORROW,
HATTIE STEVENSON.